(12) United States Patent
Gokavarapu et al.

(10) Patent No.: US 10,572,297 B2
(45) Date of Patent: Feb. 25, 2020

(54) ATTACH AN INTERPRETER-BASED TPM INTO A CLUSTER OF INTER-CONNECTED MULTI-PROCESS BASED COMPILER-BASED TPMS TO ACHIEVE GLOBAL TRANSACTION

(71) Applicant: International Business Machines Corporation, Armonk, NY (US)

(72) Inventors: Nageswararao V. Gokavarapu, Bangalore (IN); John Kurian, Bangalore (IN); Jithesh Moothoor, Bangalore (IN); Srinivasan Raghavendran, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 15/475,182

(22) Filed: Mar. 31, 2017

(65) Prior Publication Data
US 2018/0285144 A1      Oct. 4, 2018

(51) Int. Cl.
*G06F 9/46* (2006.01)
*G06F 9/54* (2006.01)
(Continued)

(52) U.S. Cl.
CPC .............. *G06F 9/466* (2013.01); *G06F 9/448* (2018.02); *G06F 9/45508* (2013.01); *G06F 9/46* (2013.01); *G06F 9/54* (2013.01); *G06F 9/541* (2013.01); *G06F 9/544* (2013.01); *G06F 9/546* (2013.01); *G06F 11/1474* (2013.01); *G06F 8/31* (2013.01); *G06F 2201/87* (2013.01)

(58) Field of Classification Search
CPC ... G06F 9/46; G06F 9/466; G06F 9/54; G06F 9/541; G06F 9/544; G06F 9/546
See application file for complete search history.

(56) References Cited

U.S. PATENT DOCUMENTS 6,157,927 A * 12/2000 Schaefer ................ G06F 9/466
7,490,272 B2    2/2009 Bay et al.
(Continued)

*Primary Examiner* — Charles M Swift
(74) *Attorney, Agent, or Firm* — Cantor Colburn LLP; William Kinnaman

(57) ABSTRACT

Aspects of the present invention include methods, systems and computer program products. The method includes a processor coordinating an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs; maintaining session management information relating to the execution of a transaction, wherein the session management information comprises communication session identifiers for the proprietary protocol of each of the at least one interpreter-type TPM and the at least one compiler-type TPM; and mapping the communication session identifiers for the proprietary protocol of each of the at least one interpreter-type TPM and the at least one compiler-type TPM to facilitate communication between the at the least one interpreter-type TPM and the at least one compiler-type TPM.

20 Claims, 9 Drawing Sheets

(51) Int. Cl.
    *G06F 9/455*     (2018.01)
    *G06F 11/14*     (2006.01)
    *G06F 9/448*     (2018.01)
    *G06F 8/30*     (2018.01)

(56) References Cited

U.S. PATENT DOCUMENTS

| | | |
|---|---|---|
| 7,617,504 B1 | 11/2009 | Hill et al. |
| 8,275,793 B2* | 9/2012 | Ahmad .................. G06F 9/466 <br> 707/792 |
| 2003/0105887 A1 | 6/2003 | Cox et al. |
| 2005/0204368 A1* | 9/2005 | Ambekar ................ G06F 9/541 <br> 719/328 |
| 2006/0288109 A1* | 12/2006 | Puthupparambil .... G06Q 20/00 <br> 709/228 |
| 2007/0256086 A1 | 11/2007 | Srinivasan et al. |
| 2008/0092139 A1* | 4/2008 | Ruby ..................... G06F 9/466 <br> 718/101 |
| 2009/0085761 A1 | 4/2009 | Buer |
| 2010/0122123 A1* | 5/2010 | Bluck ...................... G06F 8/61 <br> 714/49 |
| 2011/0055835 A1* | 3/2011 | Dennis .................. G06F 9/466 <br> 718/101 |
| 2013/0219481 A1 | 8/2013 | Voltz |
| 2015/0088956 A1 | 3/2015 | Deshpande et al. |
| 2015/0256599 A1 | 9/2015 | Kaushik et al. |

\* cited by examiner

ATTACH AN INTERPRETER-BASED TPM INTO A CLUSTER OF INTER-CONNECTED MULTI-PROCESS BASED COMPILER-BASED TPMS TO ACHIEVE GLOBAL TRANSACTION

BACKGROUND

The present invention relates in general to transaction processing, and more specifically, to methods, systems and computer program products for transaction processing in a distributed computing environment having both non-Java® based transaction processing products or modules (TPMs) and Java®-based TPMs.

Transaction processing or online transaction processing is a known computerized software approach to handling many varied types of common business or commercial (global) transactions, for example, a purchase of goods made online by an individual buyer using a credit card from a commercial seller of various goods. Transaction processing is typically carried out using a distributed computer or processor cluster, environment or system (e.g., a cloud, one or more stand-alone computers, etc.) in which various components or devices such as mainframe computers, memories, smartphones, etc., are located and are communicatively coupled together. Typically, the particular transaction must completely execute successfully. Otherwise, the transaction is considered to have failed and is then subject to roll back in which all of the operations of the transaction—including the successful ones—are erased and the transaction processing system is brought back to the state it was in prior to the start of the unsuccessful transaction.

It is common to have a global transaction span across multiple TPMs communicatively coupled together through software proprietary communication protocols. As per the known XA ("eXtended Architecture") standard for distributed transaction processing (DTP), a TPM acts as a transaction coordinator and uses a two-phase commit process to ensure data consistency with the recoverable resources associated with the transaction. When there is more than one TPM involved in a logical unit of work (LUW) or operation as part of the distributed transaction processing process, the TPM that initiates the transaction assumes the responsibility of a coordinator and the remaining TPMs act as participants.

Modern, relatively large enterprise transaction processing computer or processor architectures or systems usually include both "traditional," or older, pre-existing non-Java based TPMs (e.g., those based on the C, COBOL or other compiler-type software programming languages) as well as "newer" Java-based (e.g., Java Enterprise Edition (JEE)) or other interpreter-type software programming language (e.g., Python) TPMs. Thus, modern distributed TPMs are implemented using different software types. This is due to the different software programming language platforms utilized as well as the need to suit the services the TPMs provide. As such, the overall distributed transaction processing environment must operate across two distinct types of software programming language platforms or systems to maintain transaction context across those systems, to thereby successfully complete a global transaction.

Although newer, interpreter-type language-based TPMs can be communicatively coupled with older, more traditional compiler-type language-based TPMs, it is a challenge to extend transaction processing to an interpreter-type language-based TPM from a compiler-type language-based TPM which is already communicatively coupled with multiple other compiler-type language-based TPMs which utilize native proprietary protocols, and vice versa.

SUMMARY

According to one or more embodiments of the present invention, a computer-implemented method includes coordinating, by a processor, an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs; maintaining, by the processor, session management information relating to the execution of a transaction, wherein the session management information comprises communication session identifiers for the proprietary protocol of each of the at least one interpreter-type TPM and the at least one compiler-type TPM; and mapping, by the processor, the communication session identifiers for the proprietary protocol of each of the at least one interpreter-type TPM and the at least one compiler-type TPM to facilitate communication between the at the least one interpreter-type TPM and the at least one compiler-type TPM.

According to another embodiment of the present invention, a computer system includes a processor in communication with one or more types of memory, the processor configured to coordinate an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs; to maintain session management information relating to the execution of a transaction, wherein the session management information comprises communication session identifiers for the proprietary protocol of each of the at least one interpreter-type TPM and the at least one compiler-type TPM; and to map the communication session identifiers for the proprietary protocol of each of the at least one interpreter-type TPM and the at least one compiler-type TPM to facilitate communication between the at the least one interpreter-type TPM and the at least one compiler-type TPM.

According to yet another embodiment of the present invention, a computer program product includes a computer readable storage medium having program instructions embodied therewith, the program instructions executable by a processor to cause the processor to perform a method including coordinating an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs; maintaining session management information relating to the execution of a transaction, wherein the session management information comprises communication session identifiers for the proprietary protocol of each of the at least one interpreter-type TPM and the at least one compiler-type TPM; and mapping, by the processor, the communication session identifiers for the proprietary protocol of each of the at least one interpreter-type TPM and the at least one compiler-type TPM to facilitate communication between the at the least one interpreter-type TPM and the at least one compiler-type TPM.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
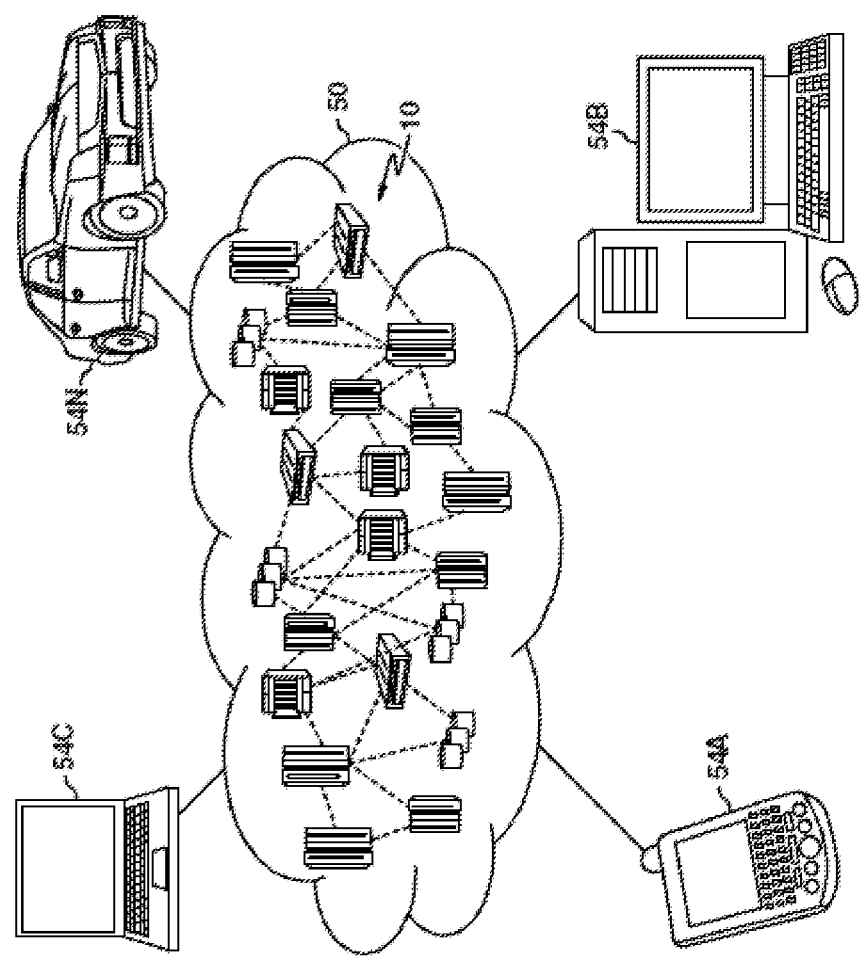
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
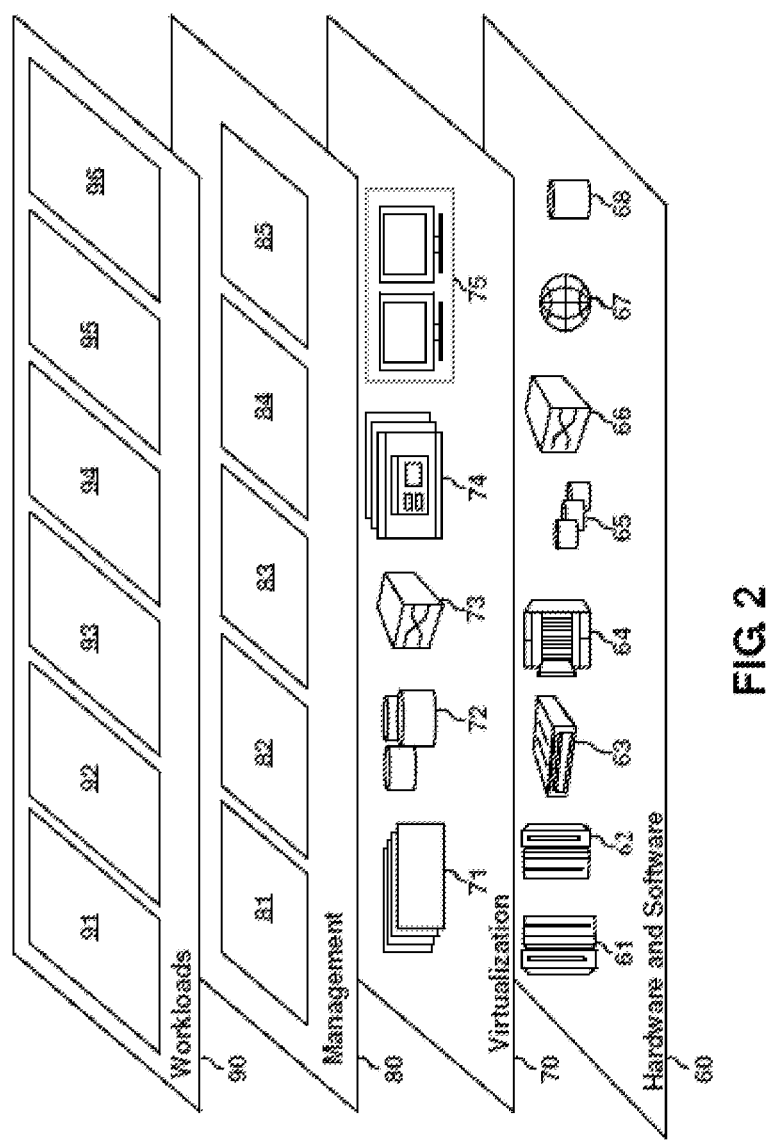
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for transaction processing in accordance with one or more embodiments of the present invention.

Figure 3:
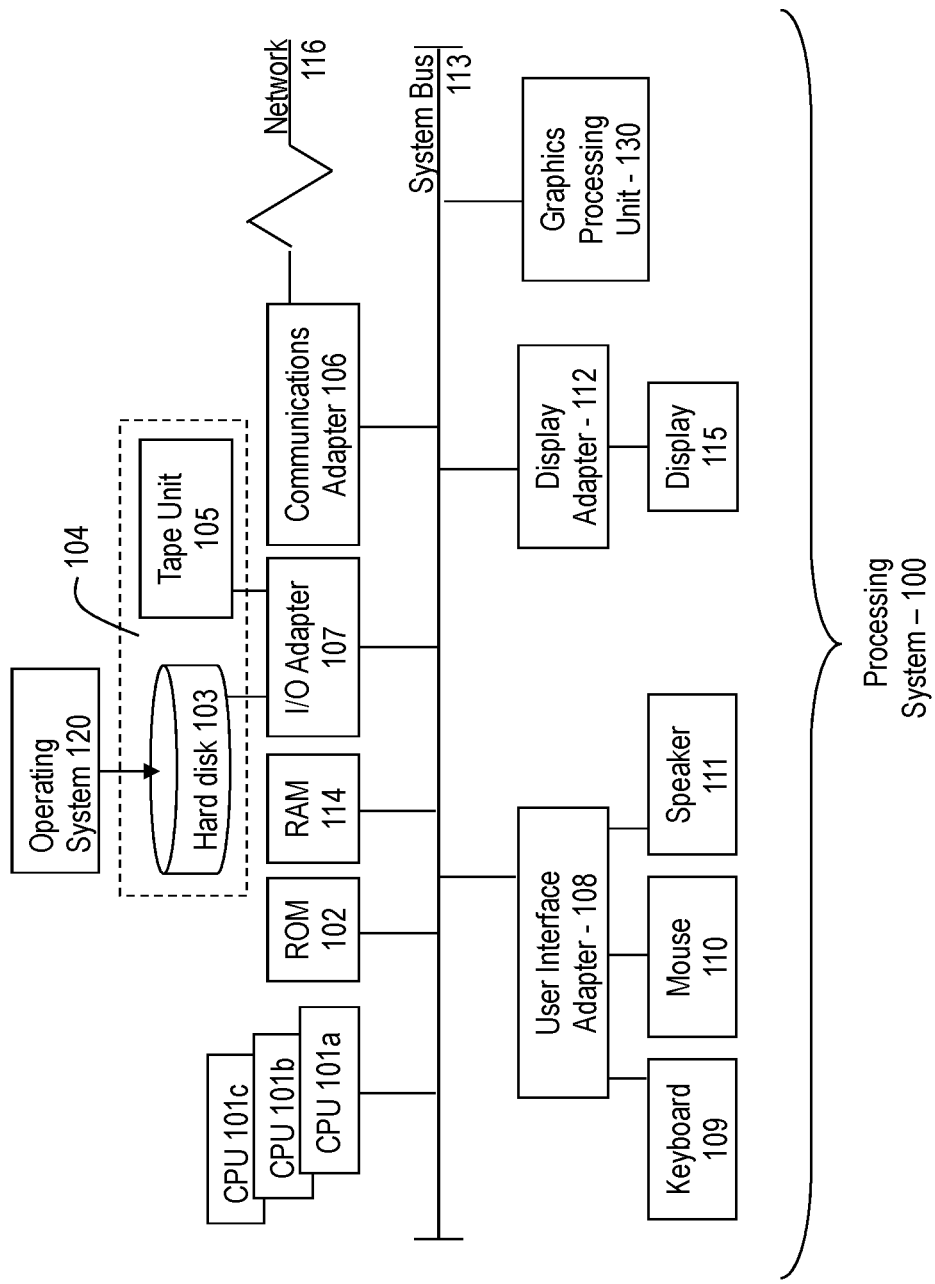
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Embodiments of the present invention extend a transaction processing process running in one or more communicatively coupled non-Java based TPMs to at least one Java-based TPM. Other embodiments extend a transaction processing process running in at least one Java-based TPM to one or more communicatively coupled non-Java based TPMs. Still other embodiments manage or maintain a transaction processing process across one or more Java-based TPMs and one or more non-Java based TPMs to achieve a successful global transaction.

Figure 4:
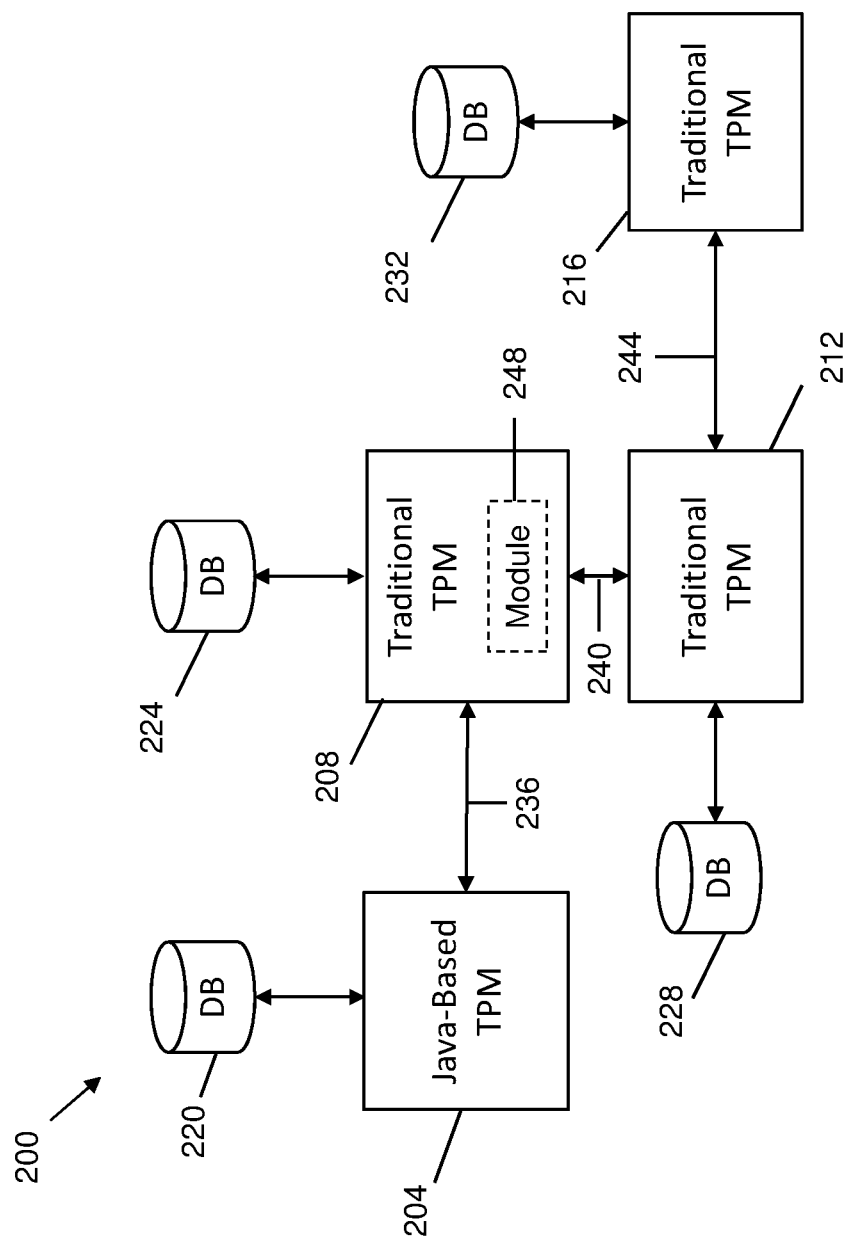
FIG. 4 is a block diagram of a transaction processing architecture according to one or more embodiments of the present invention.

Referring now to FIG. 4, according to one or more embodiments of the present invention, there illustrated is a block diagram of an architecture or configuration 200 of a non-traditional or newer Java-based transaction processing product or module (TPM) 204 integrated together or communicatively coupled with a multiple of (e.g., three) non-Java based traditional TPMs 208, 212, 216. However, more or less than three traditional TPMs 208-216 can be utilized in a transaction processing configuration. Also, more than one Java-based TPM 204 can be utilized in a transaction processing configuration.

In embodiments of the present invention, each of the non-traditional and traditional TPMs 204-216 can be embodied in the cloud computing nodes 10 that are part of the cloud computing environment 50 described hereinabove with respect to FIG. 1. Any associated devices, such as memories or databases, can also be embodied in the cloud computing environment 50 of FIG. 1. Also, in embodiments of the present invention, each of the non-traditional and traditional TPMs 204-216 (and any associated devices such as memories or databases) can be embodied in one or more of the processing systems 100 of FIG. 3.

Each of the non-traditional and traditional TPMs 204-216 can have a database associated therewith for storing data and/or information utilized in the DTP process being run on the TPMs. In an exemplary embodiment, the TPMs 204-216 are communicatively coupled together in a sequential or "chain" configuration. Yet, this is purely exemplary. Other types of coupling configurations can be utilized for coupling together the various TPMs 204-216.

As mentioned hereinabove, modern relatively large enterprise transaction processing computer or processor architectures or systems usually include both traditional or older non-Java based transactional processing products or modules (e.g., those based on the C, COBOL or other compiler-type software programming languages) as well as Java-based (e.g., Java Enterprise Edition—JEE) or other typically newer interpreter-type software programming language transaction processing products or modules communicatively coupled together. Thus, embodiments of the present invention are not limited to use with Java-based TPMs. Instead, other types of interpreter-type software programming language (e.g., Python) TPMs can be utilized in various embodiments together with compiler-type software programming languages.

In a Java-based TPM architecture (e.g., JEE servers), the TPM typically manages only one process and every logical unit of work (LUW) or operation that it required to run the transaction uses its own thread within the master process, which commonly is a Java Virtual Machine (JVM).

In FIG. 4, the Java-based TPM 204 communicates with one of the traditional TPMs 208 via a wired or wireless bus or signal line 236 using a Java-to-traditional (non-Java based) protocol for TPM communication. Also, the traditional TPM 208 communicates with another one of the traditional TPMs 212 via a wired or wireless bus or signal line 240 using a proprietary protocol for TPM communications. Further, the traditional TPM 212 communicates with another one of the traditional TPMs 216 via a wired or wireless bus or signal line 244 using a proprietary protocol for TPM communications.

According to embodiments of the present invention, in FIG. 4 the traditional TPM 208 communicatively coupled to the Java-based TPM 204 contains functionality in the form of a module 248. The module 248 performs a number of functions that allow for a Java-based TPM 204 (or other interpreter-type software programming language based TPM—e.g., Python) to adequately and properly communicate with the one or more traditional, non-Java based TPMs 208-216.

These functions in the module 248 can include maintaining session management information for Java-based and non-Java based protocols. In embodiments, the session management information can include, for example, and without limitation, a transaction branch identifier (XID) received from a Java-based TPM, a conversation identifier (ID) created for a non-Java based TPM to communicate with a Java-based TPM, and a conversation ID created for a multiple of communicatively coupled TPMs. The transaction branch identifier XID can be the known XA ("eXtended Architecture") interface standard for distributed transaction processing (DTP), which is part of the known X/Open group standard. The XA interface standard is also used herein to describe various other features of embodiments of the present invention. However, any other type of distributed transaction processing product or standard can be utilized with embodiments of the present invention, in light of the teachings herein. The module 248 can also perform transaction resolution management across multiple TPMs, recovery management in case of participant failures, and maintaining transaction states.

Figure 5:
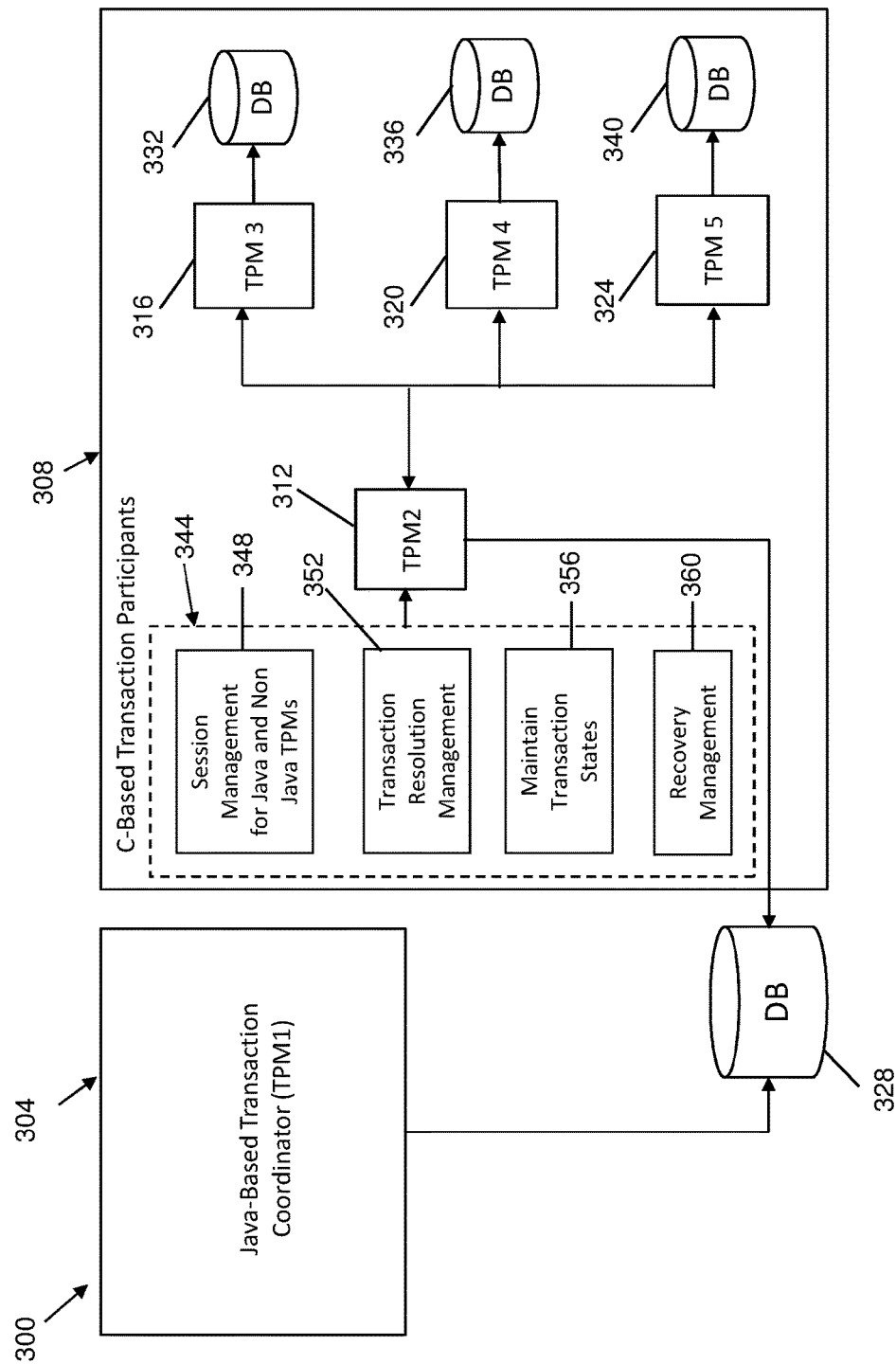
FIG. 5 is a block diagram of a transaction processing architecture according to one or more embodiments of the present invention.

Referring now to FIG. 5, there illustrated is a block diagram of a transaction processing architecture or configuration 300 according to one or more embodiments of the present invention. In the architecture 300 depicted in FIG. 5, a Java-based TPM (TPM1) 304 (or other type of interpreter-type language-based TPM—e.g., Python) is provided as a transaction coordinator. Also provided is a C-based software programming language (or other type of compiler-type programming language) cluster 308 of a multiple (four) of non-Java based TPMs; i.e., TPM2 312, TPM3 316, TPM4 320, and TPM5 324. The cluster 308 of TPMs 312-324 is provided as transaction participants. Each of the non-Java based TPMs 312-324 has an associated database (DB) 328, 332, 336, 340. The database 328 associated with TPM2 312 is also associated with the Java-based TPM 304. All of the TPMs 304, 312-324 illustrated in FIG. 5 are communicatively coupled together, similar to the architecture or configuration 200 of FIG. 4, described hereinabove.

In the transaction processing architecture or environment 300 of FIG. 5, a transaction processing process has already been historically running on the non-Java based TPMs 312-324. According to embodiments of the present invention, this existing process is extended to also run on the Java-based TPM 304. That is, the Java-based TPM 304 has been added to the transaction processing architecture or configuration 300 in accordance with embodiments of the present invention.

The cluster 308 of non-Java based TPMs 312-324 includes a module 344 (e.g., embodied in software) which functions as a "Java to traditional protocol transformer"

module. This module 344 can be included as part of, or can be accessed by, TPM2 312. Also, this module 344 can be similar to the module 248 of FIG. 4. In this embodiment, TPM2 312, which coordinates and maintains the transformer module 344, is known as an interim coordinator. According to one or more embodiments of the present invention, the module 344 includes or performs a number of functions, including a session management function 348 for the Java-based TPM 304 and for each of the non-Java based TPMs 312-324. Additional details regarding the operation of the module 344 are given in the flow diagram of the method 400 of FIG. 6, described in detail hereinafter.

In the session management function 348, communication between any two TPMs typically occurs through proprietary protocols. The protocols to communicate with Java-based TPMs 304 and non-Java based TPMs 312-324 are usually different. The session management module 348 maintains the conversation session identifiers for two different protocols and maps them to achieve the global transaction across the Java-based TPM 304 and the non-Java based TPMs 312-324. The session management function 348 can maintain, for example, a table which includes the following information for each transaction instance initiation: an XID received from a Java-based TPM 304; a conversation ID created for the non-Java based TPMs 312-324 to communicate with the Java-based TPM 304; a conversation ID created for the coupled TPMs 304, 312-324; and the transaction resolution status.

The module 344 can also include a transaction resolution management function or module 352. During the XA_COMMIT service (which is one of the services in the XA interface standard), the module 352 uses the conversation session identifiers stored during operation of the session management module 348 to flow the XA calls across the TPMs. Based on the response received from the TPMs, the function 352 resolves the transaction outcome.

When the Java-based TPM 304 invokes the XA_PREPARE service, the "Transaction Resolution Status" field in the table in the session management module 348 for that corresponding transaction initiation is updated to "Prepare Received." The module 352 flows the XA_PREPARE service to the participant TPMs 312-324 using the "Conversation ID created for interconnected TPM." If all of the participant TPMs 312-324 are prepared, the module 352 updates the "Transaction Resolution Status" field in the session management table for that corresponding transaction initiation to "Prepared OK." The module 352 sends the "Prepared OK" message to the Java-based TPM 304 using "Conversation ID created for non Java TPM to communicate with Java based TPM" in the session management table for that corresponding transaction initiation.

When the Java-based TPM 304 invokes the XA_COMMIT service, the "Transaction Resolution Status" field in the session management table for that corresponding transaction initiation is updated to "Commit Received." The module 352 flows the XA_COMMIT service to the participant TPMs 312-324 using the "Conversation ID created for interconnected TPM." If all if the participant TPMs 312-324 are committed, the module 352 updates the "Transaction Resolution Status" field in the session management table for that corresponding transaction initiation to "Commit Done." The module 352 sends the "Commit Done" message to the Java-based TPM 304 using "Conversation ID created for the non-Java TPM to communicate with Java based TPM" in the session management table for that corresponding transaction initiation. When the Java-based TPM 304 sends a reply for the XA_COMMIT service, the module 352 cleans up the session management information.

The module 344 can also include a maintain transaction states function or module 356. This module 356 maintains the transaction states from all participant TPMs 312-324. These states are used during the Transaction Resolution Management module 352 to complete the transaction. The transaction states can be "Transaction Initiated," "Prepare Received," "Commit Received," "Commit Done," "Rollback Received," and "Rollback Done."

The module 344 can also include a recovery management function or module 360. In the recovery management module 360, if any failure occurred during the transaction execution in any one of the participants TPMs 312-324, the module 360 coordinates across the TPMs 312-324 to recover the operations performed on recoverable resources to maintain the data integrity. More specifically, when the Java-based TPM 304 invokes the XA_ROLLBACK service, the "Transaction Resolution Status" field in the session management table for that corresponding transaction initiation is updated to "Rollback Received." The module 360 flows the XA_ROLLBACK service to the participant TPMs 312-324 using the "Conversation ID created for interconnected TPM." If all participant TPMs are rolled back, the module 360 updates the "Transaction Resolution Status" field in the session management table for that corresponding transaction initiation to "Rollback Done." The module 360 sends the "Rollback Done" message to the Java-based TPM 304 using the "Conversation ID created for the non-Java TPM to communicate with Java based TPM" in the session management table for that corresponding transaction initiation.

Figure 6:
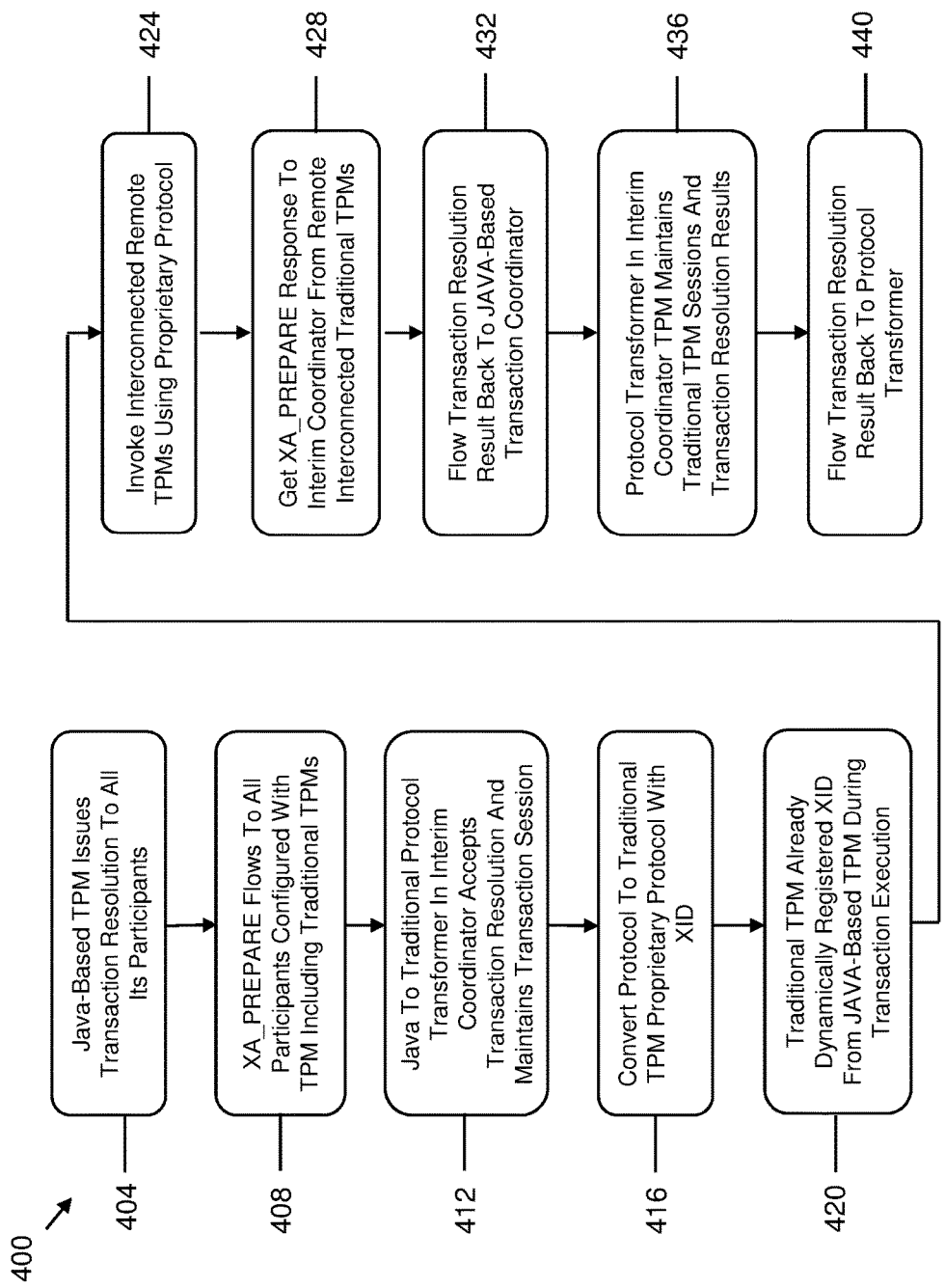
FIG. 6 is a flow diagram of a method for transaction processing according to one or more embodiments of the present invention.

Referring now to FIG. 6, there illustrated is a flow diagram of a method 400 for transaction processing according to one or more embodiments of the present invention. The method 400 provides for more detailed operation of the "Java to traditional protocol transformer" module 344 of FIG. 5; that is, the transaction processing process flow when the Java-based TPM 304 is the transaction coordinator and the non-Java based TPMs 312-324 are the transaction participants. The method 400 of FIG. 6 relates to transaction resolution flow until the transaction coordinator in the Java-based TPM 304 receives the a response from the transaction participants TPMs 312-324 via the interim coordinator 344. After receiving a response from the interim coordinator 344, the Java-based TPM 304 decides the XA resolution flow for transaction completion.

Referring also to FIG. 5, in an operation 404, the Java-based TPM 304 issues a "Transaction Resolution Status" request to all of the participants TPMs 312-324. In an operation 408, the XA_PREPARE service flows to all participant TPMs 312-324, including any of the traditional TPMs 312-324. In an operation 412, the "Java to traditional protocol transformer" in the interim coordinator 312 accepts the "Transaction Resolution Status" request and maintains the transaction session.

In an operation 416, the protocol is converted to the traditional TPM proprietary protocol with XID. In an operation 420, the traditional one of the TPMs 312-324 is dynamically registered with XID from the Java-based TPM 304 during transaction execution. An operation 424 invokes the coupled traditional TPMs 312-324 using a proprietary protocol.

In an operation 428, the XA_PREPARE service response is provided to the interim coordinator 312 from one of the traditional TPMs 312-324. An operation 432 flows the transaction resolution result back the Java-based transaction coordinator 304.

In an operation 436, the protocol transformer 344 in the interim coordinator TPM 312 maintains the traditional TPM sessions and provides the transaction resolution results. An operation 440 flows the transaction resolution result back to the protocol transformer 344.

Figure 7:
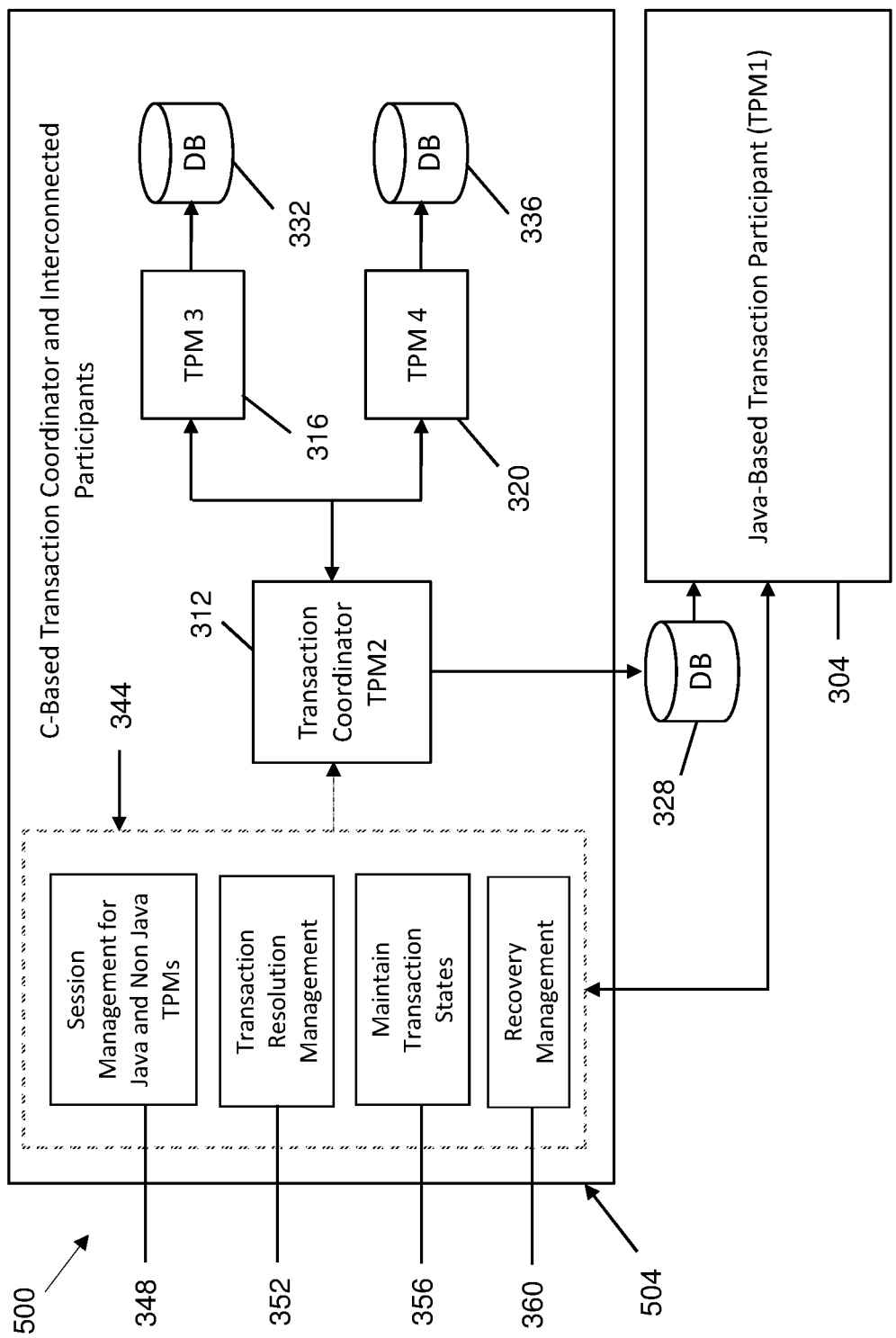
FIG. 7 is a block diagram of a transaction processing architecture according to one or more embodiments of the present invention.

Referring now to FIG. 7, there illustrated is a block diagram of a transaction processing architecture or configuration 500 according to one or more embodiments of the present invention. The architecture 500 depicted in FIG. 7 is similar to the architecture 300 of FIG. 5, described hereinabove. Thus, like reference numbers refer to like elements as between FIGS. 5 and 7, and the discussion above with respect to those functions in FIG. 5 applies as well to the similar functions in FIG. 7.

In FIG. 7, the Java-based TPM1 304 is acting as a transaction participant, while the C-based TPM configuration 504 contains the transaction coordinator 312. The architecture or configuration 500 of FIG. 7 relates to the situation in which a transaction is invoked from a traditional non-Java based TPM 312-324. Those TPMs 312-324 are communicatively coupled or interconnected with the Java-based TPM 304 so at to participate in the transaction to achieve the global transaction. In the architecture or configuration of FIG. 7, the Java to traditional protocol transformer module 344 is present in the non-Java based TPM 312. This TPM 312 also functions as the transaction coordinator, which coordinates with the TPMs 304, 312-324 to achieve the global transaction across all of the TPMs 304, 312-324.

Figure 8:
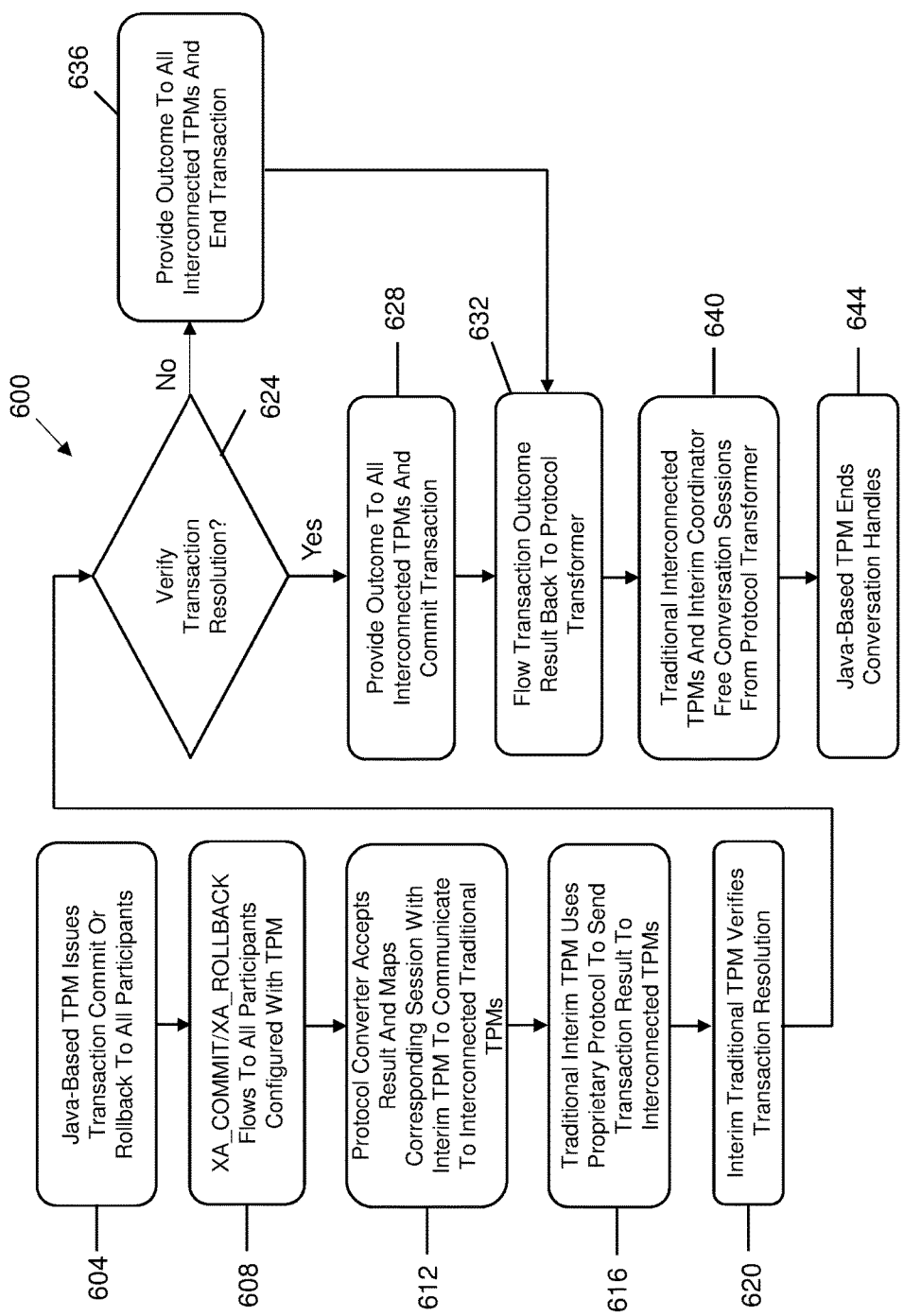
FIG. 8 is a flow diagram of a method for transaction processing according to one or more embodiments of the present invention.

Referring now to FIG. 8, there illustrated is a flow diagram of a method 600 for transaction processing according to one or more embodiments of the present invention. The method 600 relates to the flow to completion of the transaction. If any failures occur during the transaction resolution, the Java-based TPM 304 will initiate a transaction recovery process, which is described in more detail in the method 700 of the flow diagram of FIG. 9.

In an operation 604, the Java-based TPM 304 issues a Transaction Commit or Rollback to all TPMs 304, 312-324. In an operation 608, the XA_COMMIT/XA_ROLLBACK service flows to all participants TPMs 304, 312-324. In an operation 612, the protocol converter accepts the result and maps the corresponding session with the interim coordinator TPM 312 to communicate to the interconnected traditional TPMs 312-324.

In an operation 616, the traditional interim coordinator TPM 312 uses the proprietary protocol to send the transaction result to the interconnected TPMs 304, 312-324. In an operation 620, the interim coordinator TPM 312 verifies the transaction resolution in an operation 624.

If the transaction is verified, an operation 628 provides the outcome to all interconnected TPMs 304, 312-324 and commits the transaction. An operation 632 flows the transaction outcome result back to the protocol transformer 344.

If the transaction is not verified in the operation 624, an operation 636 provides the outcome to all of the interconnected TPMs 304, 312-324, and end the transaction. The method branches to the operation 632.

In an operation 640, the traditional TPMs 312-324 and the interim coordinator 312 free the conversation sessions from the protocol transformer. In an operation 644, the Java-based TPM 304 ends the conversation handles.

Figure 9:
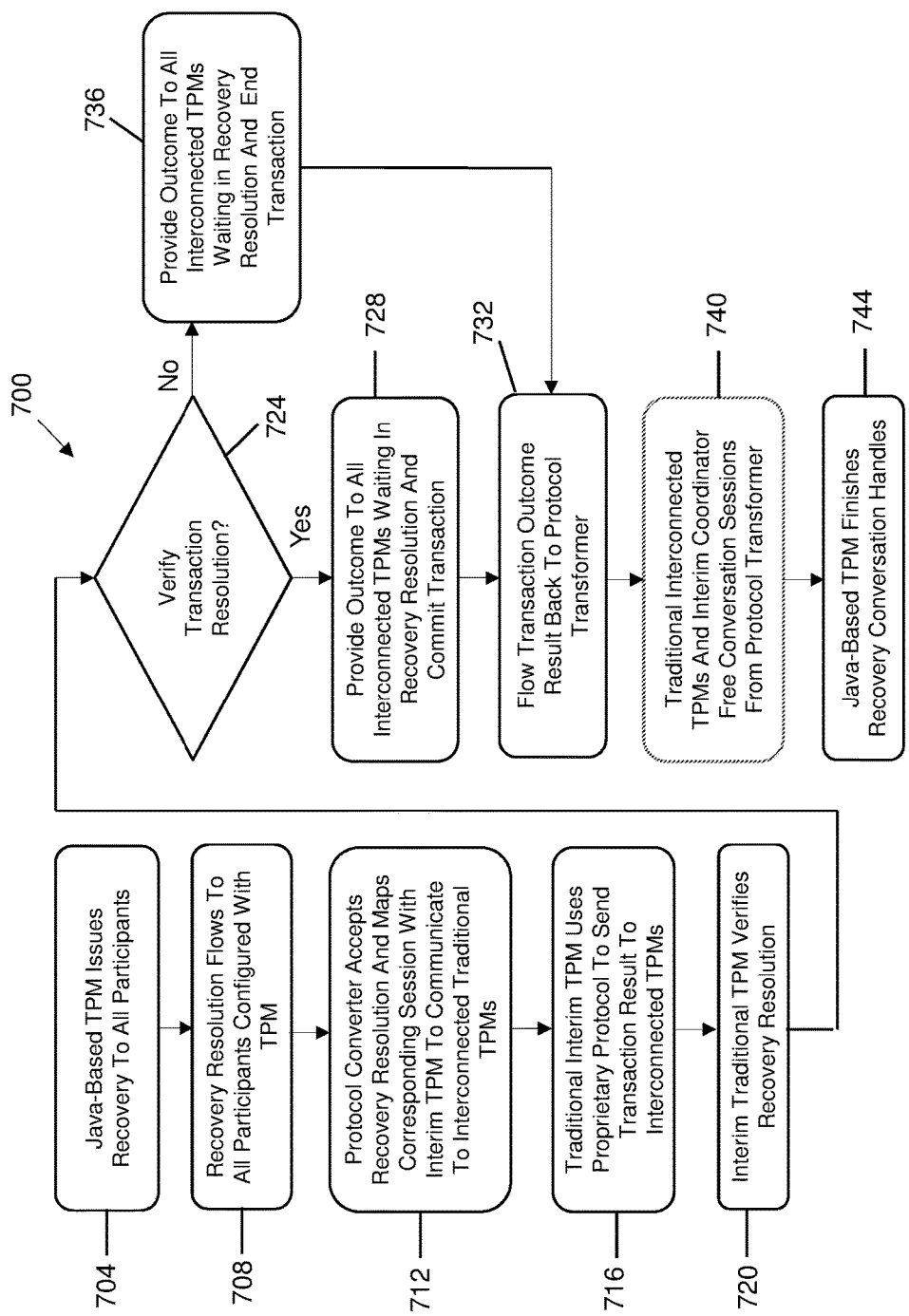
FIG. 9 is a flow diagram of a method for transaction processing according to one or more embodiments of the present invention.

Referring now to FIG. 9, there illustrated is a flow diagram of a method 700 for transaction processing according to one or more embodiments of the present invention. The method 700 is similar to the method 600 of the flow diagram of FIG. 8 except that the operations 704-744 relate to recovery resolution instead of the transaction resolution. The various operations 704-744 in the method 700 are revised accordingly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
coordinating, by a processor, an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs, wherein coordinating the execution of the transaction is initiated by the at least one interpreter-type programming language TPM;
maintaining, by the processor, session management information relating to the execution of a transaction, wherein the session management information comprises communication session identifiers for the proprietary protocol of each of the at least one interpreter-type TPM and the at least one compiler-type TPM;
mapping, by the processor, the communication session identifiers for the proprietary protocol of each of the at least one interpreter-type TPM and the at least one compiler-type TPM to facilitate communication between the at least one interpreter-type TPM and the at least one compiler-type TPM, and
issuing, from the at least one interpreter-type programming language TPM to the other TPMs, a transaction resolution request, wherein in response to receiving a response from at least one of the other TPMs, the compiler-type programming language TPM transmits the response to the interpreter-type programming language TPM.

2. The computer-implemented method of claim 1 wherein the at least one compiler-type programming language TPM comprises the TPM written in one of the C or Cobol programming languages.

3. The computer-implemented method of claim 1 wherein the at least one interpreter-type programming language TPM comprises the TPM written in one of Java or Python programming languages.

4. The computer-implemented method of claim 1 wherein coordinating, by a processor, an execution of a transaction comprises utilizing an extended architecture standard for distributed transaction processing to coordinate multiple resources of a computer system during execution of the transaction.

5. The computer-implemented method of claim 1 wherein the communication session identifiers include a transaction branch identifier received from the at least one interpreter-type TPM, a conversation identifier created for the at least one compiler-type TPM, and a conversation identifier created for a multiple of communicatively coupled TPMs.

6. The computer-implemented method of claim 1 wherein maintaining, by the processor, session management information relating to the execution of a transaction further comprises the processor performing transaction resolution management, performing recovery management in an event of a failure of one of the TPMs, and maintaining transaction states.

7. The computer-implemented method of claim 1 wherein the processor is located in one of a cloud computing environment or a distributed computing environment, and wherein the method is implemented in software run by the processor located in one of the cloud computing environment or the distributed computing environment.

8. A computer system comprising:
a processor in communication with one or more types of memory, the processor configured to:
coordinate an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs, wherein coordinating the execution of the transaction is initiated by the at least one interpreter-type programming language TPM;
maintain session management information relating to the execution of a transaction, wherein the session management information comprises communication session identifiers for the proprietary protocol of each of the at least one interpreter-type TPM and the at least one compiler-type TPM;
map the communication session identifiers for the proprietary protocol of each of the at least one interpreter-type TPM and the at least one compiler-type TPM to facilitate communication between the at the least one interpreter-type TPM and the at least one compiler-type TPM, and
issue, from the at least one interpreter-type programming language TPM to the other TPMs, a transaction resolution request, wherein in response to receiving a response from at least one of the other TPMs, the compiler-type programming language TPM transmits the response to the interpreter-type programming language TPM.

9. The computer system of claim 8 wherein the at least one of a compiler-type programming language TPM comprises the TPM written in one of the C or Cobol programming languages.

10. The computer system of claim 8 wherein the at least one of an interpreter-type programming language TPM comprises the TPM written in one of Java or Python programming languages.

11. The computer system of claim 8 wherein the processor configured to coordinate an execution of a transaction comprises the processor configured to utilize an extended architecture standard for distributed transaction processing to coordinate multiple resources of a computer system during execution of the transaction.

12. The computer system of claim 8 wherein the communication session identifiers includes a transaction branch identifier received from the at least one interpreter-type TPM, a conversation identifier created for the at least one compiler-type TPM, and a conversation identifier created for a multiple of communicatively coupled TPMs.

13. The computer system of claim 8 wherein the processor configured to maintain session management information relating to the execution of a transaction comprises the processor configured to perform transaction resolution management, to perform recovery management in an event of a failure of one of the TPMs, and to maintain transaction states.

14. The computer system of claim 8 wherein the processor is located in one of a cloud computing environment or a distributed computing environment.

15. A computer program product for performing a method, the computer program product comprising a computer readable storage medium having program instructions embodied therewith, the program instructions executable by a processor to cause the processor to perform a method comprising:
coordinating an execution of a transaction between at least one compiler-type programming language transaction processing module (TPM) and at least one interpreter-type programming language TPM, wherein the at least one compiler-type TPM and the at least one interpreter-type TPM each have a proprietary protocol for communicating with other TPMs, wherein coordinating the execution of the transaction is initiated by the at least one interpreter-type programming language TPM;
maintaining session management information relating to the execution of a transaction, wherein the session management information comprises communication session identifiers for the proprietary protocol of each of the at least one interpreter-type TPM and the at least one compiler-type TPM;
mapping the communication session identifiers for the proprietary protocol of each of the at least one interpreter-type TPM and the at least one compiler-type TPM to facilitate communication between the at the least one interpreter-type TPM and the at least one compiler-type TPM, and
issuing, from the at least one interpreter-type programming language TPM to the other TPMs, a transaction resolution request, wherein in response to receiving a response from at least one of the other TPMs, the compiler-type programming language TPM transmits the response to the interpreter-type programming language TPM.

16. The computer program product of claim 15 wherein the at least one of a compiler-type programming language TPM comprises the TPM written in one of the C or Cobol programming languages.

17. The computer program product of claim 15 wherein the at least one of an interpreter-type programming language TPM comprises the TPM written in one of Java or Python programming languages.

18. The computer program product of claim 15 wherein coordinating an execution of a transaction comprises utilizing an extended architecture standard for distributed transaction processing to coordinate multiple resources of a computer system during execution of the transaction.

19. The computer program product of claim 15 wherein the communication session identifiers includes a transaction branch identifier received from the at least one interpreter-type TPM, a conversation identifier created for the at least one compiler-type TPM, and a conversation identifier created for a multiple of communicatively coupled TPMs.

20. The computer program product of claim 15 wherein the processor is located in one of a cloud computing environment or a distributed computing environment, and wherein the program instructions are implemented in software run by the processor located in one of the cloud computing environment or the distributed computing environment.

* * * * *